(12) United States Patent
Katabi

(10) Patent No.: US 10,989,803 B1
(45) Date of Patent: Apr. 27, 2021

(54) SECURITY PROTOCOL FOR MOTION TRACKING SYSTEMS

(71) Applicant: MASSACHUSETTS INSTITUTE OF TECHNOLOGY, Cambridge, MA (US)

(72) Inventor: Dina Katabi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 79 days.

(21) Appl. No.: 16/106,966

(22) Filed: Aug. 21, 2018

Related U.S. Application Data

(60) Provisional application No. 62/548,058, filed on Aug. 21, 2017.

(51) Int. Cl.
| | |
|---|---|
| G01S 13/72 | (2006.01) |
| G01S 13/50 | (2006.01) |
| G01S 13/88 | (2006.01) |
| G01S 13/00 | (2006.01) |

(52) U.S. Cl.
CPC ............ *G01S 13/723* (2013.01); *G01S 13/50* (2013.01); *G01S 13/88* (2013.01)

(58) Field of Classification Search
CPC ......... G01S 13/723; G01S 13/50; G01S 13/88
See application file for complete search history.

(56) References Cited

U.S. PATENT DOCUMENTS

| | | | |
|---|---|---|---|
| 5,331,953 A | 7/1994 | Andersson et al. | |
| 7,010,445 B2 | 3/2006 | Battenberg et al. | |
| 7,215,698 B2 | 5/2007 | Darby et al. | |
| 7,636,855 B2 * | 12/2009 | Applebaum | G06F 21/32 713/186 |
| 7,698,002 B2 * | 4/2010 | Music | G06F 3/017 700/17 |
| 7,753,849 B2 | 7/2010 | Morgan et al. | |
| 7,811,234 B2 | 10/2010 | McGrath | |

(Continued)

FOREIGN PATENT DOCUMENTS

| | | |
|---|---|---|
| CN | 1342968 A | 4/2002 |
| CN | 101313231 A | 11/2008 |

(Continued)

OTHER PUBLICATIONS

M. Agnes et al., "Webster's New World College Dictionary," fourth edition; Wiley Publishing, Inc.; Cleveland, Ohio, USA; copyright in the year 2007; ISBN 0-02-863119-6; entry for the verb, "provision." (Year: 2007).*

(Continued)

*Primary Examiner* — Bernarr E Gregory
(74) *Attorney, Agent, or Firm* — Occhiuti & Rohlicek LLP

(57) ABSTRACT

An approach to authentication, provisioning, and/or access control makes use of a user performing prescribed motion of their body and/or particular limbs (e.g., a prescribed number of steps in one or more directions), for example, as part of a challenge-response protocol. The motion may be detected using the radio frequency reflection techniques. Applications of this approach may include provisioning of equipment that monitors motion within an environment. In some examples, the environment is defined as part of the user performing the prescribed motion (e.g., the user walks around a boundary of their house).

12 Claims, 1 Drawing Sheet

(56) References Cited

U.S. PATENT DOCUMENTS

| | | | |
|---|---|---|---|
| 7,916,066 B1 | 3/2011 | Osterweil | |
| 7,973,702 B2 | 7/2011 | Rofougaran et al. | |
| 8,059,700 B2 | 11/2011 | Lopez-Risueno et al. | |
| 8,174,931 B2 | 5/2012 | Vartanian et al. | |
| 8,179,816 B1 | 5/2012 | Vaidyanathan et al. | |
| 8,232,866 B2 | 7/2012 | McGrath et al. | |
| 8,516,561 B2* | 8/2013 | White | G06F 3/017 726/18 |
| 8,539,550 B1* | 9/2013 | Terres | G06F 21/31 726/16 |
| 8,721,554 B2 | 5/2014 | Lin et al. | |
| 8,884,809 B2 | 11/2014 | Hyde et al. | |
| 8,905,928 B2 | 12/2014 | Hayes et al. | |
| 8,925,070 B2* | 12/2014 | Sriraghavan | G06F 21/36 713/183 |
| 8,954,758 B2* | 2/2015 | Leoutsarakos | G06F 21/31 713/193 |
| 8,988,792 B2 | 3/2015 | Fujimoto | |
| 9,186,079 B2 | 11/2015 | Mase et al. | |
| 9,202,027 B2* | 12/2015 | Odessky | G06F 21/31 |
| 9,229,102 B1 | 1/2016 | Wright et al. | |
| 9,239,917 B2* | 1/2016 | Kapinos | G06F 21/31 |
| 9,253,592 B1 | 2/2016 | Moscovich | |
| 9,274,210 B2 | 3/2016 | Enge et al. | |
| 9,443,419 B2 | 9/2016 | Wilson et al. | |
| 9,477,812 B2 | 10/2016 | Lin et al. | |
| 9,492,099 B2 | 11/2016 | Gamble et al. | |
| 9,584,503 B2* | 2/2017 | Zhang | H04L 63/083 |
| 9,626,498 B2* | 4/2017 | Gay | G06F 21/36 |
| 9,811,164 B2* | 11/2017 | Poupyrev | G06F 3/017 |
| 10,135,667 B1 | 11/2018 | Greer | |
| 10,139,916 B2* | 11/2018 | Poupyrev | G01S 13/88 |
| 10,218,407 B2* | 2/2019 | Trotta | G01S 13/88 |
| 10,310,620 B2* | 6/2019 | Lien | G01S 13/88 |
| 2003/0209077 A1 | 11/2003 | Battenberg et al. | |
| 2004/0130442 A1 | 7/2004 | Breed | |
| 2007/0139216 A1 | 6/2007 | Breed | |
| 2008/0074307 A1 | 3/2008 | Boric-Lubecke et al. | |
| 2008/0077015 A1 | 3/2008 | Boric-Lubecke et al. | |
| 2008/0119716 A1 | 5/2008 | Boric-Lubecke et al. | |
| 2008/0234568 A1 | 9/2008 | Ouchi | |
| 2008/0275328 A1 | 11/2008 | Jones | |
| 2008/0275337 A1 | 11/2008 | Fossan et al. | |
| 2008/0316085 A1 | 12/2008 | Rofougaran et al. | |
| 2009/0209850 A1 | 8/2009 | Tao et al. | |
| 2009/0271004 A1* | 10/2009 | Zecchin | G05B 15/02 700/13 |
| 2009/0278728 A1 | 11/2009 | Morgan et al. | |
| 2009/0303108 A1 | 12/2009 | Hilsebecher et al. | |
| 2010/0241009 A1 | 9/2010 | Petkie | |
| 2011/0181509 A1* | 7/2011 | Rautiainen | G01S 13/88 345/158 |
| 2011/0260856 A1 | 10/2011 | Rossmann et al. | |
| 2011/0279366 A1 | 11/2011 | Lohbihler | |
| 2012/0087212 A1 | 4/2012 | Vartanian | |
| 2012/0116186 A1 | 5/2012 | Shrivastav et al. | |
| 2012/0116187 A1 | 5/2012 | Hayes et al. | |
| 2012/0182617 A1 | 7/2012 | Fujimoto | |
| 2012/0185096 A1 | 7/2012 | Rosenstein | |
| 2012/0192617 A1 | 8/2012 | Walton et al. | |
| 2012/0242501 A1 | 9/2012 | Tran | |
| 2012/0250546 A1 | 10/2012 | Hamida | |
| 2012/0274498 A1 | 11/2012 | Hyde et al. | |
| 2012/0304284 A1* | 11/2012 | Johnson | G06F 21/36 726/19 |
| 2013/0069818 A1 | 3/2013 | Shirakawa et al. | |
| 2013/0113647 A1 | 5/2013 | Sentelle et al. | |
| 2013/0182539 A1 | 7/2013 | Barkin | |
| 2013/0300573 A1 | 11/2013 | Brown et al. | |
| 2014/0058256 A1 | 2/2014 | De Jong | |
| 2014/0247148 A1 | 9/2014 | Proud | |
| 2014/0266914 A1 | 9/2014 | Schwartz et al. | |
| 2014/0310764 A1* | 10/2014 | Tippett | G06F 21/31 726/1 |
| 2015/0058973 A1* | 2/2015 | Haberman | G06F 21/36 726/19 |
| 2015/0164379 A1 | 6/2015 | Lin et al. | |
| 2015/0193938 A1 | 7/2015 | Freedman | |
| 2015/0269825 A1 | 9/2015 | Tran | |
| 2015/0301167 A1 | 10/2015 | Sentelle et al. | |
| 2016/0022204 A1 | 1/2016 | Mostov | |
| 2016/0030006 A1 | 2/2016 | Okuya et al. | |
| 2016/0054804 A1 | 2/2016 | Gollakata | |
| 2016/0200276 A1 | 7/2016 | Diewald | |
| 2016/0311388 A1 | 10/2016 | Diewald | |
| 2017/0082741 A1 | 3/2017 | Adib | |
| 2017/0150891 A1 | 6/2017 | Tsuchimoto et al. | |
| 2017/0262996 A1 | 9/2017 | Jain et al. | |
| 2017/0300650 A1 | 10/2017 | Margon | |
| 2018/0054262 A1 | 2/2018 | Noethlings et al. | |
| 2018/0348343 A1 | 12/2018 | Achour et al. | |

FOREIGN PATENT DOCUMENTS

| | | | |
|---|---|---|---|
| EP | 2492709 A1 | 8/2012 | |
| GB | 2349759 A | 11/2000 | |
| JP | H11271430 A | 10/1999 | |
| JP | 2000338231 A | 12/2000 | |
| JP | 2008-282092 A * | 11/2008 | G06F 3/048 |
| JP | 2009541725 A | 11/2009 | |
| JP | 2010263953 A | 11/2010 | |
| JP | 2011033498 A | 2/2011 | |
| JP | 2013068433 A | 4/2013 | |
| JP | 2014039666 A | 3/2014 | |
| JP | 2014517253 A | 7/2014 | |
| WO | 2009047546 A1 | 4/2009 | |
| WO | 2012116187 A1 | 8/2012 | |
| WO | 2013/034716 A1 | 3/2013 | |
| WO | 2013177431 A1 | 11/2013 | |
| WO | 2014172668 A1 | 10/2014 | |
| WO | 2015006701 A2 | 1/2015 | |
| WO | 2015/017239 A2 | 2/2015 | |
| WO | 2016/176600 A1 | 11/2016 | |

OTHER PUBLICATIONS

Sungchang Choi, Yonggyu Kim and Joongsoo Ma, "Adaptive localization algorithm for movement of mobile node," 2012 14th International Conference on AdvancedCommunication Technology (ICACT), PyeongChang, 2012, pp. 184-188.

Anitori, Laura et al.; "FMCW radar for life-sign detection," In 2009 IEEE Radar Conference, pp. 1-6. IEEE (2009).

Nguyen, Van et al.; "Harmonic Path (HAPA) algorithm for non-contact vital signs monitoring with IR-UWB radar." In 2013 IEEE Biomedical Circuits and Systems Conference (BioCAS), pp. 146-149 IEEE (2013).

Wang, Yazhou et al.; "Simultaneous Localization and Respiration Detection of Multiple People Using Low Cost UWB Biometric Pulse Doppler Radar Sensor," IEEE, 978-1-4673-1088 (2012).

Zhang, Dan et al.; "FMCW Radar for Small Displacement Detection of Vital Signal Using Projection Matrix Method," International Journal of Antennas and Propagation, vol. 2013, Article ID 571986, 5 pages (2013).

Mingmin Zhao et al. "Through-Wall Human Pose Estimation Using Radio Signals," 2018 IEEE/CVF Conference on Computer Vision and Pattern Recognition, IEEE, Jun. 18, 2018 (Jun. 18, 2018), pp. 7356-7365, XP033473655, DOI: 10.1109/CVPR.2018.00768.

* cited by examiner

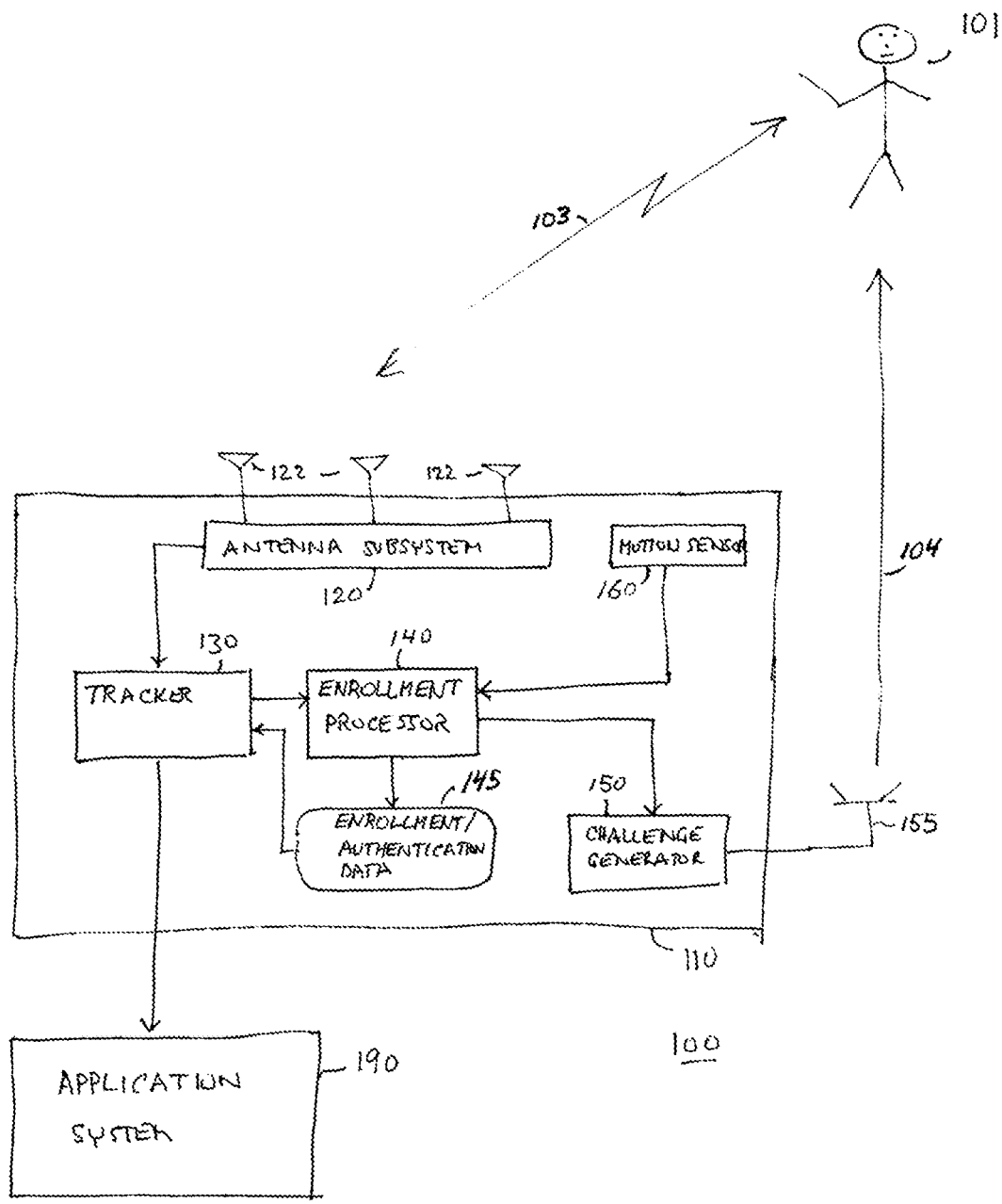

SECURITY PROTOCOL FOR MOTION TRACKING SYSTEMS

CROSS-REFERENCE TO RELATED APPLICATIONS

This application claims the benefit of U.S. Provisional Application No. 62/548,058, filed on Aug. 21, 2017, which is incorporated herein by reference.

BACKGROUND

This invention relates to security protocols for motion tracking systems.

Recent years have seen new technologies that can track human motion without requiring the monitored person to carry or wear a sensor on his or her body. Hence these devices do not require the consent of the monitored user or even awareness of the monitoring. For example, U.S. Pat. No. 9,753,131 describes a system that permits monitoring of a person's 3D location using RF reflections off a subject's body. It does this through walls and obstacles. U.S. Pat. Pub. 2017/0042432 describes a system that can track a person' breathing and heartbeats without body contact and through walls and obstacles.

Because such devices can operate even when the monitored person is oblivious to their presence, there is a need to ensure privacy and/or authority to perform such monitoring.

SUMMARY

In one aspect, in general, an approach to authentication, provisioning, and/or access control makes use of a user performing prescribed motion of their body and/or particular limbs (e.g., a prescribed number of steps in one or more directions), for example, as part of a challenge-response protocol. The motion may be detected using the radio frequency reflection techniques. Applications of this approach may include provisioning of equipment that monitors motion within an environment. In some examples, the environment is defined as part of the user performing the prescribed motion (e.g., the user walks around a boundary of their house).

Other features and advantages of the invention are apparent from the following description, and from the claims.

DESCRIPTION OF DRAWINGS

FIG. 1 is a system diagram.

DESCRIPTION

Referring to FIG. 1, a motion-based system 100 includes a tracking system 110, which is able to track motion of a subject 101 in an environment (e.g., in a room in which the system is located, or in which the system can track motion through one or more walls, etc.). The tracking system provides motion-based data to an application system 190, which processes the motion-based data and performs various actions or analyses based on that data. In some examples, the application system is tightly coupled to the tracking system 110, for example, being integrated in a single device, or in communication over a local area network. In some examples, the application system may be remote from the tracking system, for example, executing in a dedicated or shared server remote from the tracking system 110 and in communication over the public Internet.

Continuing to refer to FIG. 1, the tracking system 110 is able to sense motion of the subject 101 using a non-contact technology. In the system illustrated in FIG. 1, a radio-frequency system is illustrated in which antennas 122 of an antenna subsystem 120 are used to emit radio frequency signals and receive corresponding reflections of the emitted signals from the subject. Very generally, the tracker 130 has the capability to process the relationship between the emitted signals and the received reflections to infer motion of the subject. In various examples of such a system, the motion may include one or more of (a) gross motion, such as walking in a particular pattern in a room, (b) limb or gesture motion that relates to absolute or relative motion of particular limbs or body parts, and (c) fine motion, such a motion that encodes heart rate or breathing rate through, for example, period motion of the subject's chest.

Notwithstanding the ability of the tracker 130 to process signals (e.g., RF transmission and reflection signals) to infer the motion of the subject, for one or more reasons the tracking system 110 as a whole inhibits such information to be provided, for example, to one or more application systems 190 based on enrollment/authentication data 145. For example, the data may represent one or more of (a) a spatial region in which the tracking system 110 is permitted to provide motion data, (b) a time period during which such motion may be provided, and (c) a type of motion data that may be provided.

The enrollment/authentication data 145 may be configured in a variety of ways. One way this data can be configured relates soliciting explicit authorization from the subject, for example, to maintain the privacy of the subject for example required by agreed upon privacy policies related to operation of the system. One example of soliciting authorization is by emitting a prompt or other signal that would be perceived (e.g., heard or seen) by the subject as well as other individual in the vicinity. For example, the prompt may generated by a challenge generator 150 (e.g., based on recorded or computer synthesized speech) and be emitted via an audio speaker 155. For example, the prompt might be "To authorize motion tracking in this room, please <specification of authentication motion>", where the specification of authentication motion may be a reference to a pre-defined (possibly secret) motion pattern, such as "take two steps to the left and then two steps back" or "wave with your right hand" or "hold your breath for 5 seconds, breathe normally, and then hold your breath for 5 seconds again". Optionally, the system may announce the initiation of motion tracking "Motion tracking is being initiated. If you do not wish your motion to be tracked, please leave this vicinity." As indicated above, prompts are not necessary audio, in some instances, in other versions, the prompt may instead or in addition be via a visual display, such as a computer or television screen.

Continuing to refer to FIG. 1, the enrollment/authentication process is controlled by an enrollment processor 140 of the tracking system. For example, then the tracking system is turned on, or tracking is requested by the application system 190, the enrollment processor may cause the challenge generator 150 to emit the challenge of a type described above. The enrollment processor 140 then receives tracking data from the tacker 130, and determines whether this tracking data forms a suitable response to the challenge. If it does, the enrollment processor save corresponding enrollment/authentication data 145, which is used by the tracker 130 to permit the passing of motion data to the application system 190. For example, the enrollment processor may have one of a variety of pattern matchers to determine whether the response was suitable, for example, a motion template matcher or a neural network pattern matcher.

In some examples, the motion-based system 100 or the tracking system 110 are portable, and therefore it may be possible for authentication or enrollment to be performed in one location or in a particular orientation, and then transfer the system to another location or orientation in which the system should not be authorized to monitor motion. In some examples of the system, an optional motion sensor 160 (e.g., using inertially-based sensing; radio positioning, etc.) provides signals to the enrollment processor that indicate the change. The enrollment processor may then cancel the authorization by writing appropriate information in the enrollment/authentication data 145, of may initiate a new challenge requiring response from the subject.

There are other situations in which the enrollment processor may terminate the authorization to monitor motion in the environment, including one or more of (a) an elapsed time, for example, a predetermined duration such as 30 minutes; (c) an elapsed time after a motion-based event, such as 10 minutes after the subject leaves the sensing vicinity of the system, or immediately is a second subject enters the vicinity; or (c) an explicit gesture or other motion input from the subject that indicates that the system is to stop sensing.

As introduced above, the tracker 130 may use radio frequency reflections as the basis of the motion tracking. In some embodiments, the approach used makes use of techniques described in one or more of the following applications, each of which is incorporated herein by reference:
- U.S. Pat. No. 9,753,131 titled "Motion Tracking Via Body Radio Reflections" issued on Sep. 5, 2017 (also corresponding to International Application No. PCT/US2014/059856, titled "Motion Tracking Via Body Radio Reflections" and filed Oct. 9, 2014, and U.S. Pat. Pub. 2017/0082741 published Mar. 23, 2017);
- U.S. Pat. Pub. 2017/0074980, titled "Object Tracking Via Radio Reflections", published Mar. 16, 2017 (also corresponding to International Application No. PCT/US2015/017239, filed Feb. 24, 2015); and
- U.S. Pat. Pub. 2017/0042432, titled "Vital Signs Monitoring Via Radio Reflections," published Feb. 16, 2017 (corresponding to International Application No. PCT/US2015/027945, and filed Apr. 28, 2015)

and the following publications, each of which is also incorporated herein by reference:
- 3D Tracking via Body Radio Reflections Fadel Adib, Zach Kabelac, Dina Katabi, Robert C. Miller Usenix NSDI'14, Seattle, Wash., April 2014
- Multi-Person Localization via RF Body Reflections Fadel Adib, Zach Kabelac, Dina Katabi Usenix NSDI'15, Oakland, Calif., May 2015
- Demo: Real-time Breath Monitoring Using Wireless Signals Fadel Adib, Zach Kabelac, Hongzi Mao, Dina Katabi, Robert C. Miller ACM MobiCom'14, Maui, Hi., September 2014
- Smart Homes That Monitor Breathing and Heart Rate Fadel Adib, Hongzi Mao, Zach Kabelac, Dina Katabi, Robert C. Miller CHI'15, Seoul, South Korea, April 2015
- Capturing the Human Figure Through a Wall Fadel Adib, Chen-Yu Hsu, Hongzi Mao, Dina Katabi, Fredo Durand ACM SIGGRAPH Asia'15, Kobe, Japan, November 2015

Although the radio-frequency approaches described above provide advantages, for example, being able to sense through some physical barriers, relatively low cost etc., other sensing modes may be used. For example, rather than using reflected radio frequency signals, acoustics (e.g., ultrasound) signals may be used to track motion. Also, optical techniques may be used with a camera or camera array (e.g., for depth sensing) may be used to sense natural or synthetic illumination of a subject from with the subject's motion is determined by an alternative version of the tracker 130 configured for such signals. Of course, yet other embodiments may use two or more sensing modes together.

Without limiting the approach, the following are examples of the approaches described above:

Example 1: the user installs the device in the desired location. When the user turns the device on, she is asked to stand at a specific distance (or location) in front of the device. Say she is asked to stand at 2 meters in front of the device. The user is then asked to perform a sequence of movements. For example, she may be asked to first take two steps to the right. Next, take two steps to the left. Next take two steps back, etc. The device monitors the user as she performs the sequence and checks that it matches the desired movements. If not, the user is asked to repeat and eventually denied access if she cannot pass the response phase. Since the device can track people, the main point of this exercise is to ascertain that the person the device is monitoring is actually aware of the monitoring process. Once this check is performed the device can monitor this blob/person until it loses it.

Example 2: In our home security example, the user wants the device to track people in her home, not just track her. So the next step in the protocol is to prove to the device that the user has access to the monitored space. Once the user performs the above step, the user walks through the area she wants to monitor. The device will follow the user motion and mark those locations and store the marking for future use. The device may fill in some small areas in the middle of where the user walked. For example, the user may walk around a table. The table will still be considered as part of the home. These marked locations are considered accessible to this user and the device will allow her to use her credential (e.g., password) for future access to the data from that space.

Example 3: What if the user performs the above protocol, showing the device her ability to access a particular area, then changes the device's position and points it toward a space that she has no access to—e.g., the neighbor's home. Since the device localizes with respect to itself, in the absence of additional information, the device may confuse the marked space with some other space that the user should not have access to. To prevent this, the device should include a sensor (or mechanism) to detect its own motion (e.g., an accelerometer or infrared sensor). If the device detects that it was moved since the last time the privacy protocol was performed, it will require the user to repeat the protocol (both steps 1 and 2) before giving her access again.

Example 4: A similar approach can be done for monitoring breathing and heart signals (other type of device-free monitoring). The challenge-response in this case could be a body motion like above or a breathing motion, e.g., the device asks the user to take a breath then release her breath in a particular timed manner.

As discussed above, the motion-based system 100, or at least the tracking system 110, may be incorporated into a device that is installed or placed in the room or other region in which motion is to be sensed. For example, the tracking system 110 may be integrated into a personal assistant device, which may also be configured to respond to voice commands. The motion-based authentication may be used to ensure privacy of motion in the sensing range of the assistant device, and may also be used to ensure privacy of other modes of sensing, such as audio and/or video sensing. As another example, the tracker may be integrated in a hospital room monitoring system (e.g., with a central application system being used to monitor multiple beds in the hospital).

Implementations of the system may be computer controller or computer implemented, with one or more processors of the tracking system 100 being configured with software instructions stored on a machine-readable medium of the system. These instructions then cause one or more physical or logical processors of the system to perform the steps of the approaches described above. For example, the instructions may be machine level instructions, programming language statements (whether interpreted or compiled), or instructions at an intermediate level (e.g., object code, code libraries, etc.). Alternative implementations may have hardware implementations of one or more of the components, for example, using Application Specific Integrated Circuits (ASICs), Field Programmable Gate Arrays (FPGAs) and the like, and a combination of software- and hardware-based implementations may be used.

It is to be understood that the foregoing description is intended to illustrate and not to limit the scope of the invention, which is defined by the scope of the appended claims. Other embodiments are within the scope of the following claims.

What is claimed is:

1. A method of authentication and/or access control comprising:
    prompting a user to perform a commanded motion-based action;
    determining an observer motion-based action of the user using radio-frequency based tracking;
    determining if the observed motion-based action matches the commanded motion-based action;
    if the observer motion-based action matches the commanded motion-based action, performing an authentication, and/or access control operation including authorizing a user to use a motion tracking system or providing a user access to the motion tracking system for observation of subsequent motion-based action of the user; and
    deauthenticating the user or revoking the user's access to the motion tracking system upon detecting that the motion tracking system has been moved from one location to another location.

2. The method of claim 1 wherein:
    the commanded motion-based action comprises a limb-based motion.

3. The method of claim 2 wherein:
    the commanded motion-based action comprises whole-body motion.

4. The method of claim 3 wherein:
    the whole-body motion comprises a movement to a prescribed location.

5. The method of claim 3 wherein:
    the whole-body motion comprises a sequence of prescribed relative movements.

6. The method of claim 1 further comprising provisioning the motion tracking system, including:
    prompting a user to perform a commanded motion-based action;
    determining an observed motion-based action of the user using radio-frequency based tracking; and
    provisioning the motion tracking system according to the observed motion-based action.

7. The method of claim 6 wherein the observed motion-based action comprises movement to a plurality of locations in an environment, and provisioning the system is performed according to said plurality of locations.

8. The method of claim 1 wherein determining the observed motion-based action of the user using radio-frequency based tracking comprises:
    emitting first radio signals from one or more transmitting antennas;
    acquiring second radio signals at one or more receiving antennas, the second radio signals comprising reflections of the first radio signals from the user; and
    processing the second radio signals to determine the motion-based action of the user.

9. The method of claim 1 further comprising deauthenticating the user or revoking the user's access to the motion tracking system upon determining that a predetermined amount of time has elapsed.

10. The method of claim 1 further comprising deauthenticating the user or revoking the user's access to the motion tracking system upon determining that a predetermined amount of time has elapsed since the motion tracking system last detected movement of the user.

11. A system comprising:
    a motion-tracking system comprising
        a radio transmitter;
        a plurality of antennas, each antenna being configured for transmission and/or receiving of radio signals; and
        a processor configured cause emission of first radio signals via one or more of the antennas, to process signal received at one or more of the antennas to track motion; and
    a controller configured to
        prompt a user to perform a commanded motion-based action;
        determine an observer motion-based action of the user using radio-frequency based tracking;
        determine if the observed motion-based action matches the commanded motion-based action;
        if the observer motion-based action matches the commanded motion-based action, perform an authentication, and/or access control operation including authorizing a user to use a motion tracking system or providing a user access to the motion tracking system for observation of subsequent motion-based action of the user; and
        deauthenticate the user or revoke the user's access to the motion tracking system upon detecting that the motion tracking system has been moved from one location to another location.

12. A method of authentication and/or access control comprising:
    prompting a user to perform a commanded motion-based action;
    determining an observer motion-based action of the user using radio-frequency based tracking;
    determining if the observed motion-based action matches the commanded motion-based action;
    if the observer motion-based action matches the commanded motion-based action, performing an authentication, and/or access control operation including authorizing a user to use a motion tracking system or providing a user access to the motion tracking system for observation of subsequent motion-based action of the user; and deauthenticating the user or revoking the user's access to the motion tracking system upon detecting a gesture indicating that the motion tracking system should enter a privacy mode of operation.

\* \* \* \* \*